United States Patent
Hunzinger

(10) Patent No.: US 6,718,171 B1
(45) Date of Patent: Apr. 6, 2004

(54) ROBUST AND EFFICIENT REACQUISITION AFTER CALL RELEASE

(75) Inventor: Jason F. Hunzinger, Carlsbad, CA (US)

(73) Assignee: Denso Corporation, Kariya (JP)

( * ) Notice: Subject to any disclaimer, the term of this patent is extended or adjusted under 35 U.S.C. 154(b) by 315 days.

(21) Appl. No.: 09/640,481

(22) Filed: Aug. 16, 2000

Related U.S. Application Data

(60) Provisional application No. 60/214,111, filed on Jul. 26, 2000.

(51) Int. Cl.[7] ............................................... H04Q 7/20
(52) U.S. Cl. ..................... 455/450; 455/435.3; 455/442; 455/452.2; 455/509; 455/513; 370/342; 370/441
(58) Field of Search .............................. 455/432, 433, 455/434, 435, 442, 447, 450, 452, 432.1, 435.1, 435.3, 436–438, 452.1, 452.2, 509–514; 370/320, 335, 342, 441

(56) References Cited

U.S. PATENT DOCUMENTS

| | | | | | |
|---|---|---|---|---|---|
| 5,910,944 | A | * | 6/1999 | Callicotte et al. ............ | 370/311 |
| 6,021,123 | A | * | 2/2000 | Mimura ....................... | 370/331 |
| 6,119,010 | A | * | 9/2000 | Labedz ........................ | 455/446 |
| 6,263,010 | B1 | * | 7/2001 | Naruse et al. ............... | 375/130 |
| 6,393,295 | B1 | * | 5/2002 | Butler et al. ................. | 455/458 |
| 6,411,819 | B1 | * | 6/2002 | Gutowski ..................... | 455/525 |
| 6,421,540 | B1 | * | 7/2002 | Gilhousen et al. ........... | 455/458 |
| 6,473,607 | B1 | * | 10/2002 | Shohara et al. .............. | 455/343 |
| 6,501,958 | B1 | * | 12/2002 | Hwang et al. ............... | 455/522 |
| 2001/0021179 | A1 | * | 9/2001 | Tiedemann et al. ......... | 370/333 |
| 2003/0112857 | A1 | * | 6/2003 | Cleveland ..................... | 375/152 |

FOREIGN PATENT DOCUMENTS

EP     1 187 369 A2   *   3/2002           H04B/7/26

* cited by examiner

*Primary Examiner*—Nay Maung
*Assistant Examiner*—Edan Orgad
(74) *Attorney, Agent, or Firm*—Harness, Dickey & Pierce, PLC

(57) ABSTRACT

A mobile station provides for a more robust reacquisition process with the base station. The mobile station performs an evaluation of the signal conditions from the base station. The mobile station may perform this evaluation at the end of a call, upon release, or immediately after release. If the signal is strong, the mobile station will jump directly back to the synchronization channel. However, if the signal has deteriorated, the mobile station may determine it is more appropriate to reacquire the pilot signal of a base station. The mobile station may also use the signal characteristics to determine whether to perform a full acquisition, a quick acquisition, or a wide acquisition. The mobile station may also use a history to assist in the reacquisition process.

19 Claims, 3 Drawing Sheets

ROBUST AND EFFICIENT REACQUISITION AFTER CALL RELEASE

CROSS-REFERENCE TO RELATED APPLICATIONS

This application claims benefit of U.S. Provisional application No. 60/214,111, filed Jul. 26, 2000.

TECHNICAL FIELD

This invention relates to wireless communication systems, and more particularly to enhance reacquisition of the network within wireless communication systems.

BACKGROUND

Cellular telephones may operate under a variety of standards including the code division multiple access (CDMA) cellular telephone communication system as described in TIA/EIA, IS-95, Mobile station-Base Station Compatibility Standard for Dual-Mode Wideband Spread Spectrum Cellular System, published July 1993. CDMA is a technique for spread-spectrum multiple-access digital communications that creates channels through the use of unique code sequences. In CDMA systems, signals can be and are received in the presence of high levels of interference. The practical limit of signal reception depends on the channel conditions, but CDMA reception in the system described in the aforementioned IS-95 Standard can take place in the presence of interference that is 18 dB larger than the signal for a static channel. Typically, the system operates with a lower level of interference and dynamic channel conditions.

In current CDMA systems, mobile stations acquire the pilot signal of a base station. The pilot signal has identifying spreading code used by the mobile station. The mobile stations use the pilot signal to synchronize themselves with the base station so the mobile stations can recognize any of the other channels necessary. Once a mobile station acquires the pilot signal of a base station, the mobile station may communicate with the base station over the appropriate channels of the wireless communication system.

After completing a call, or upon call release, the mobile station currently resynchronizes with the base station using the sync channel. Under strong signal conditions, this poses no problems. However, when the signal conditions deteriorate, the mobile station may be unable to resynchronize with the pilot base station. What is needed is a system that allows resynchronization under strong signal conditions but allows for reacquisition when signal conditions deteriorate.

SUMMARY

The present invention creates a more robust reacquisition process for the mobile station. The mobile station performs an evaluation of the signal conditions from the base station. The mobile station may perform this evaluation at the end of a call, upon release, or immediately after release. If the signal is strong, the mobile station will jump directly back to the synchronization channel. However, if the signal has deteriorated, the mobile station may determine it is more appropriate to reacquire the pilot signal of a base station. The mobile station may also use the signal characteristics to determine whether to perform a full acquisition, a quick acquisition, or a wide acquisition. The mobile station may also use a history to assist in the reacquisition process.

One aspect of the invention is a method of reacquisition in a wireless communication system. The method comprises obtaining a metric indicating of signal conditions and comparing the metric to a first predetermined threshold. If the metric meets or exceeds the first predetermined threshold, the method attempts connection with the synchronization channel. If the metric does not meet the first predetermined threshold, the method performs reacquisition. The method may also compare the metric to a second predetermined threshold and attempt narrow reacquisition if the metric meets or exceed the second predetermined threshold.

Another aspect of the invention is a method of enhancing reacquisition in a wireless communication system. The method comprises determining signal strength and connecting to the synchronization channel if the signal strength meets or exceeds a first threshold. The method then performs narrow reacquisition if the signal strength is between the first threshold and a second threshold. If the signal strength is at or below the second threshold, the method performs full reacquisition. The method may further creating a history log of reacquisition performance and determine the first threshold and the second threshold using historical data in the history log.

Another aspect of the invention is a mobile station for use in a wireless communication system. The mobile station comprises a signal quality indicator which determines signal quality. A reacquisition logic circuit then determines the appropriate reacquisition procedure based on the signal quality.

DESCRIPTION OF DRAWINGS

These and other features and advantages of the invention will become more apparent upon reading the following detailed description and upon reference to the accompanying drawings.

DETAILED DESCRIPTION

Figure 1:
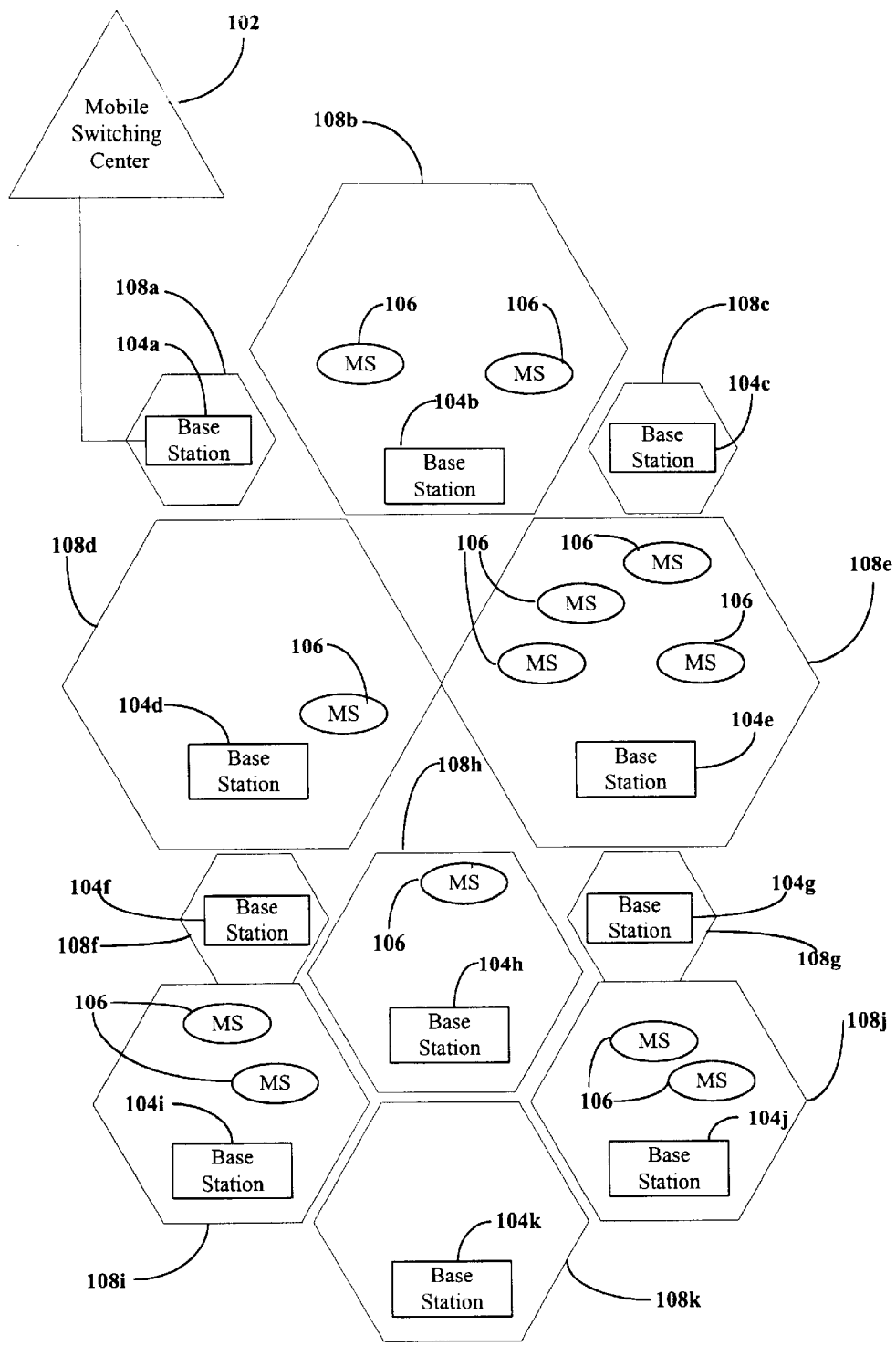
FIG. 1 illustrates the components of an exemplary wireless communication system used by one embodiment of the present invention.

FIG. 1 illustrates components of an exemplary wireless communication system. A mobile switching center 102 communicates with base stations 104a–104k (only one connection By shown). The base stations 104a–104k (generally 104) broadcasts data to and receives data from mobile stations 106 within cells 108a–108k (generally 108). The cell 108 is a geographic region, roughly hexagonal, having a radius of up to 35 kilometers or possibly more.

A mobile station 106 is capable of receiving data from and transmitting data to a base station 104. In one embodiment, the mobile station 106 receives and, transmits data according to the Code Division Multiple Access (CDMA) standard. CDMA is a communication standard permitting mobile users of wireless communication devices to exchange data over a telephone system wherein radio signals carry data to and from the wireless devices.

Under the CDMA standard, additional cells 108a, 108c, 108d, and 108e adjacent to the cell 108b permit mobile stations 106 to cross cell boundaries without interrupting communications. This is so because base stations 104a, 104c, 104d, and 104e in adjacent cells assume the task of transmitting and receiving data for the mobile stations 106. The mobile switching center 102 coordinates all communication to and from mobile stations 106 in a multi-cell region. Thus, the mobile switching center 102 may communicate with many base stations 104.

Mobile stations 106 may move about freely within the cell 108 while communicating either voice or data. Mobile its stations 106 not in active communication with other telephone system users may, nevertheless, scan base station 104 transmissions in the cell 108 to detect any telephone calls or paging messages directed to the mobile station 106.

One example of such a mobile station 106 is a cellular telephone used by a pedestrian who, expecting a telephone call, powers on the cellular telephone while walking in the cell 108. The cellular telephone scans certain frequencies (frequencies known to be used by CDMA) to synchronize communication with the base station 104. The cellular telephone then registers with the mobile switching center 102 to make itself known as an active user within the CDMA network.

When detecting a call, the cellular telephone scans data frames broadcast by the base station 104 to detect any telephone calls or paging messages directed to the cellular telephone. In this call detection mode, the cellular telephone receives, stores and examines paging message data, and determines whether the data contains a mobile station identifier matching an identifier of the cellular telephone. If a match is detected, the cellular telephone establishes a call with the mobile switching center 102 via the base station 104. If no match is detected, the cellular telephone enters an idle state for a predetermined period of time, then exits the idle state to receive another transmission of paging message data.

Figure 2:
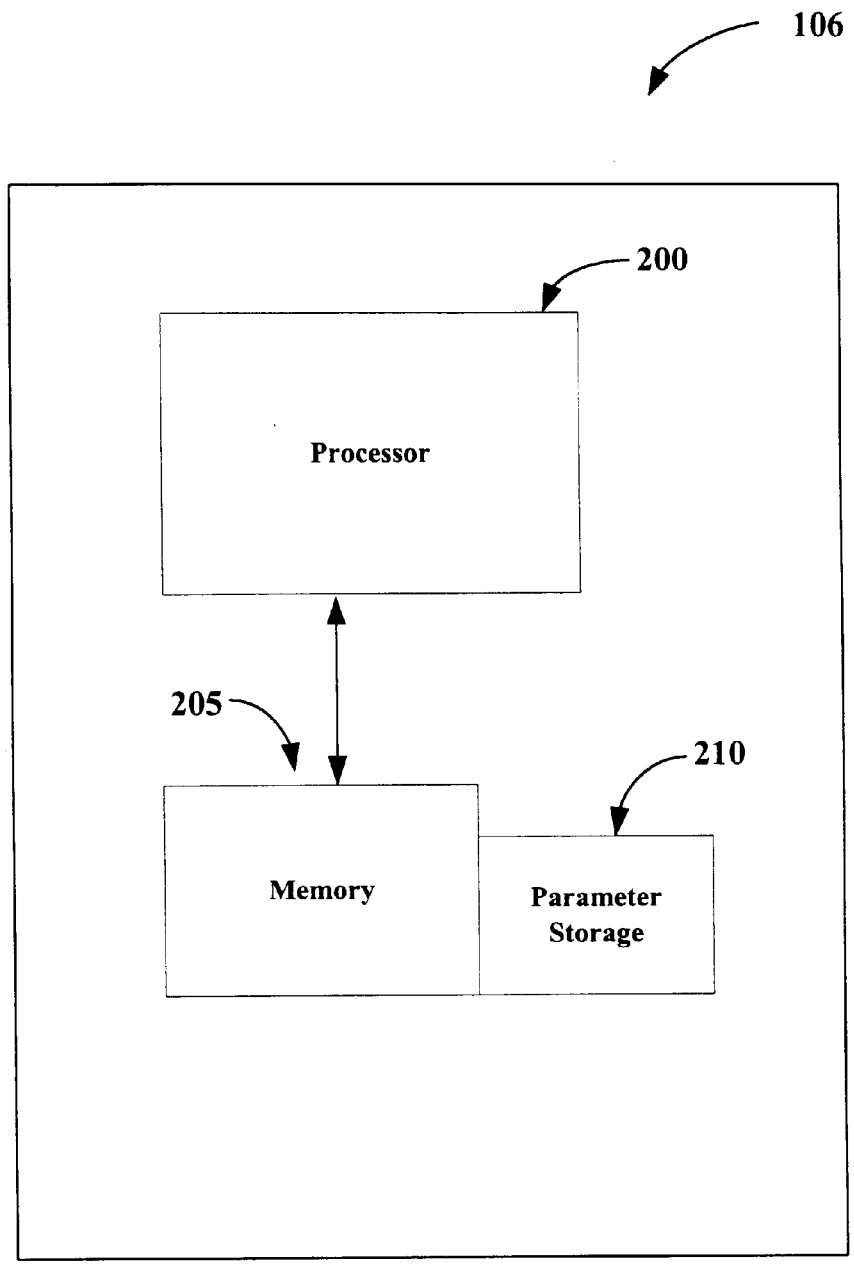
FIG. 2 is a block diagram showing features of a mobile station according to one embodiment of the invention.

FIG. 2 shows a block diagram of the mobile station 106 and the processing that occurs in that mobile station 106. The processor 200 is driven by a program stored in a memory 205. Parameters for the mobile station 106 may also be stored in another part of memory shown here as 210. The memory 210 stores various conditions including information obtained from searches to base stations.

Figure 3:
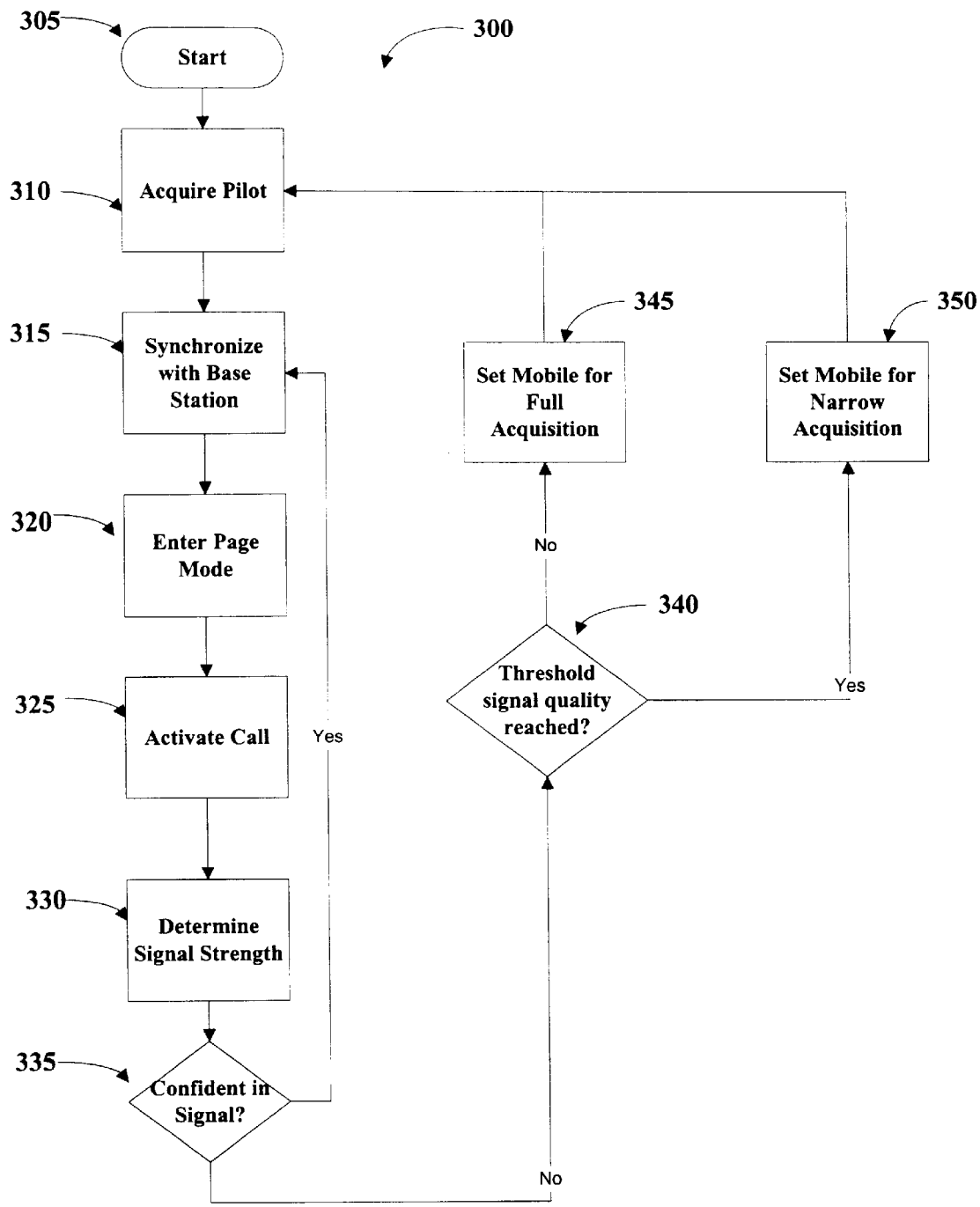
FIG. 3 is a flowchart illustrating the reacquisition process according to one embodiment of the present invention.

The processor 200 executes a process 300 shown in FIG. 3. The process 300 begins at a START state 305. Proceeding to state 310, the mobile station 106 enters the acquisition mode to acquire the pilot signal. The mobile station 106 may acquire the pilot signal using a full acquisition or a narrow acquisition. A full acquisition has the mobile station 106 synchronize with the base station 104 using the pilot signal without any known variables. A narrow acquisition may use known variables of the pilot signal such as offset and timing information. Of course, when first synchronizing with a pilot signal, the mobile station 106 uses the full acquisition. If the mobile station 106 is reacquiring the pilot signal, the narrow acquisition may be used.

The mobile station 106 performs acquisition using the search element. The search element may be configured using a number of parameters. These parameters allow the searcher to restrict the range of several factors, including the pseudo-noise (PN) space that it searches, how much tolerance there is for fading, and how much tolerance there is for frequency error. The terms "wide" and "narrow" refer to the ranges of these parameters, and in general refers to the PN space. A narrow acquisition might focus on only PN space around the last known pilot whereas a wide acquisition might search all of PN space for all pilots. Similarly, a narrow acquisition could describe a situation where the acquisition does not tolerate much frequency error or other factor.

Proceeding to state 315, the mobile station 106 synchronizes with the base station 104 using the information in the pilot signal. The mobile station 106 uses the received pilot signal to synchronize its spreading sequences and phase align its local oscillator (LO). After synchronization, the mobile station 106 can freely communicate with the base station 104.

Proceeding to state 320, the mobile station 106 enters a page mode. In the page mode, the mobile station 106 monitors the base station 104 awaiting communications. The base station 104 may address a mobile station 106 in the page mode to, among other things, inform the mobile station 106 of incoming calls. While in the page mode, the mobile station 106 may also enter an idle mode to conserve power.

Proceeding to state 325, the mobile station 106 activates a call with the base station 104. The call activation may be the result of an incoming call and a page by the base station 104, or an outgoing call initiated by the mobile station 106. The mobile station 106 remains in state 325 during the call process.

At the end of the call, the mobile station 106 proceeds to state 330 to determine the signal strength from the base station 104. The mobile station 106 may determine the signal strength at the end of the call, upon release, or shortly after call release. When the mobile station 106 determines the signal strength may be predetermined and may vary among mobile stations 106. The mobile station 106 uses a variety of indicators to determine signal power. A known standard measurement of forward link system coverage has been to monitor the signal strength of the pilot signal as a function of the total interference density in the CDMA carrier band, popularly known as Ec/Io. Other indicators include is a bit error rate, a symbol error rate, a frame error rate, a receiver quality indicator (RX Quality), a receive signal strength indicator (RSSI), also known as RX Level, determining the period of time of a finger lock is maintained, or having the finger correlation of a null/preamble signal above a certain threshold. The mobile station 106 uses these indicators to determine the signal quality.

In particular, the bit error rate is the number of erroneous bits in a data transmission. The RX Quality is a value assigned by the network indicating the quality of the received signal based upon the bit error rate. The RX Quality figure provides a mobile station 106 with an expected measurement accuracy. The mobile station 106 uses the RX Quality to determine the overall potential for error.

Another measurement that may be used by the mobile station 106 is RSSI. RSSI provides a known value based upon the measured strength of the signal at the mobile station 106. A stronger signal at the mobile station 106 indicates less likelihood for error. Table 2 provides sample values for RSSI based upon the signal strength at the mobile station 106. Each specific value for RSSI correlates to the strength of the signal (in measured decibels (dBm)) at the mobile station 106 receiver.

TABLE 2

| RSSI | Level at Receiver (dBm) |
|---|---|
| 0 | Less than −110 |
| 1 | −110 to −109 |
| 2 | −109 to −108 |
| . | . |
| . | . |
| . | . |
| 62 | −49 to −48 |
| 63 | above −48 |

After determining the signal strength, the mobile station 106 proceeds to state 335. In state 335, the mobile station determines a confidence level in the signal. This may be accomplished by having a predefined threshold for a quality metric programmed into the mobile station 106. If the metric meets or exceeds this threshold, then the signal quality is assumed to be good and the mobile station 106 is confident in the signal. However, if the metric is below the threshold, the signal quality is presumed to be weak and the mobile station 106 indicates a lack of confidence in the signal.

If the signal quality is good and the mobile station is confident in the signal, the process 300 proceeds along the YES branch to state 315 where the mobile station resynchronizes with the base station 104. The mobile station 106 then reenters the paging mode to stay in communication with the wireless system.

Returning to state 335, if the signal quality metric is below the threshold indicating a lack of confidence in the signal, the process 300 proceeds along the NO branch to state 340. In state 340, the signal quality metric is compared against a second threshold level to determine if a lower level of confidence can be assumed. The second threshold level is lower than the threshold level used to determine signal confidence in state 335. If the signal quality exceeds the second threshold, the mobile station 106 proceeds along the YES branch to state 350. In state 350, the mobile station 106 is set up to perform a narrow acquisition. In a narrow acquisition, the signal quality is high enough to use some known information such as offset and timing information to simplify the acquisition process.

Returning to state 340, if the signal quality metric falls below the second threshold, the process 300 proceeds along the NO branch to state 345. In state 345, the mobile station 106 has a lack of confidence in the prior signal and is therefore set for a full acquisition. The full acquisition procedure has the mobile station 106 completely reacquire a base station 104 without using any previously known information. After the mobile station 106 is set for either full acquisition in state 345 or narrow acquisition in state 350, the process 300 proceeds to state 310 where the acquisition process is performed. The mobile station 104 remains in the process 300 as long as the mobile station is active in the wireless communication system.

The mobile station 106 may also compile a history log recording the results of the resynchronization or reacquisition attempts. The history log may indicate whether the attempts to resynchronize succeeded. Based on this historical data, the mobile station 106 may adjust the values of the threshold values to enhance the success rate of reconnecting with the base station 104.

Numerous variations and modifications of the invention will become readily apparent to those skilled in the art. Accordingly, the invention may be embodied in other specific forms without departing from its spirit or essential characteristics.

What is claimed is:

1. A method of reacquisition in a wireless communication system comprising:
    obtaining a metric indicating of signal conditions;
    comparing the metric to a first predetermined threshold prior to establishing a connection with a base station;
    attempting connection with a synchronization channel if the metric meets or exceeds the first predetermined threshold;
    attempting connection with a pilot channel if the metric does not meet the first predetermined threshold; and
    comparing the metric to a second predetermined threshold and attempting narrow reacquisition if the metric is between the first threshold and a second threshold, wherein the second threshold is less than the first threshold.

2. The method of claim 1, wherein the metric indicates signal quality.

3. The method of claim 1, wherein the metric is receive signal strength indicator (RSSI).

4. The method of claim 1, wherein the metric is bit error rate.

5. The method of claim 1, wherein the metric is Ec/Io.

6. The method of claim 1, wherein the metric is finger correlation.

7. A method of enhancing reacquisition in a wireless communication system comprising:
    determining signal strength for a pilot channel;
    connecting to a synchronization channel if the signal strength meets or exceeds a first threshold;
    performing narrow reacquisition if the signal strength is between the first threshold and a second threshold, wherein the second threshold is less than the first threshold and the narrow reacquisition uses offset and timing information associated with the pilot signal; and
    performing full reacquisition if the signal strength is at or below the second threshold.

8. The method of claim 7, further comprising creating a history log of reacquisition performance.

9. The method of claim 8, further comprising determining the first threshold and the second threshold using historical data in the history log.

10. The method of claim 7, wherein the first threshold and the second threshold are predetermined.

11. The method of claim 7, wherein the signal strength is determined using a signal quality metric.

12. The method of claim 7, wherein the signal strength is determined by a mobile station.

13. The method of claim 7, wherein the signal strength is determined upon call release.

14. The method of claim 7, wherein the signal strength is determined following call release.

15. A mobile station for use in a wireless communication system comprising:
    a signal quality indicator which determines signal quality; and
    a reacquisition logic circuit which determines an appropriate reacquisition procedure based on the signal quality prior to attempting the appropriate reacquisition procedure, wherein the reacquisition logic circuit connects the mobile station to a synchronization channel if the signal quality meets or exceeds a first threshold, and directs the mobile station to reacquire a base station if the signal quality falls below a first threshold; wherein:
        the reacquisition logic circuit directs the mobile station to reacquire a base station if the signal quality falls below a first threshold; and
        the reacquisition logic circuit directs the mobile station to perform a narrow reacquisition if the signal quality is between the first threshold and a second threshold, wherein the second threshold is greater than the first threshold.

16. The mobile station of claim 15, wherein the reacquisition logic circuit connects the mobile station to a synchronization channel if the signal quality exceeds the first threshold.

17. The mobile station of claim 15, wherein the signal quality indicator determines the signal quality using a metric.

18. The mobile station of claim 17, wherein the metric is RSSI.

19. The mobile station of claim 17, wherein the metric is finger correlation.

* * * * *